(12) United States Patent
Venkatesan

(10) Patent No.: US 8,537,673 B1
(45) Date of Patent: Sep. 17, 2013

(54) FAIRNESS ALGORITHM FOR BUNDLE RESOURCE UTILIZATION

(75) Inventor: Sivakumar Venkatesan, Sunnyvale, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 928 days.

(21) Appl. No.: 12/105,746

(22) Filed: Apr. 18, 2008

(51) Int. Cl.
*G01R 31/08* (2006.01)

(52) U.S. Cl.
USPC .......................................... 370/230.1; 370/235

(58) Field of Classification Search
USPC .................. 370/242, 235, 252, 230, 230.1
See application file for complete search history.

(56) References Cited

U.S. PATENT DOCUMENTS

| | | | | |
|---|---|---|---|---|
| 6,778,495 B1* | 8/2004 | Blair | | 370/230 |
| 7,245,614 B1* | 7/2007 | Podar et al. | | 370/389 |
| 2003/0039250 A1* | 2/2003 | Nichols et al. | | 370/394 |
| 2003/0072261 A1* | 4/2003 | Shinagawa | | 370/229 |
| 2005/0005021 A1* | 1/2005 | Grant et al. | | 709/232 |
| 2005/0180465 A1* | 8/2005 | Srinivasan et al. | | 370/503 |
| 2006/0050634 A1* | 3/2006 | Gous | | 370/229 |
| 2007/0041321 A1* | 2/2007 | Sasaki et al. | | 370/235 |
| 2009/0080328 A1* | 3/2009 | Hu et al. | | 370/230 |

OTHER PUBLICATIONS

K. Sklower; B. Lloyd; G. McGregor; D. Carr; T. Coradetti, Network Working Group, Request for Comments: 1990, "The PPP Multilink Protocol (MP)", Aug. 1996.

K. Sklower; B. Lloyd; G. McGregor; D. Carr; Network Working Group, Request for Comments: 1717, "The PPP Multilink Protocol (MP)", Nov. 1994.

\* cited by examiner

*Primary Examiner* — Mark Rinehart
*Assistant Examiner* — Matthew Hopkins
(74) *Attorney, Agent, or Firm* — Shumaker & Sieffert, P.A.

(57) ABSTRACT

Resource utilization required for processing packets associated with multilink bundles of a router are tracked. Corrective actions can be taken to provide fair usage of the available resources by comparing actual usage to a predetermined threshold value, and taking corrective actions if that threshold is exceeded.

27 Claims, 7 Drawing Sheets

FAIRNESS ALGORITHM FOR BUNDLE RESOURCE UTILIZATION

CROSS-REFERENCE TO RELATED APPLICATIONS

N/A

STATEMENTS REGARDING FEDERALLY SPONSORED RESEARCH OR DEVELOPMENT

N/A

REFERENCE TO A MICROFICHE APPENDIX

N/A

BACKGROUND OF THE INVENTION

1. Field of the Invention

The present invention generally relates to network routing, and relates more particularly to the fair allocation of resources in a multilink point-to-point protocol (PPP) bundle.

2. Description of the Related Art

Modern data communications utilize a variety of different forms of packet communications. Within a packet network, many of the links are point-to-point links between peer nodes. When a need for increased bandwidth on such a link arises, one option is to replace the existing link with a higher bandwidth link. However, this approach often is prohibitively expensive, particularly as an incremental upgrade. Accordingly, the solution to providing increased bandwidth often entails deploying one or more new links of similar or somewhat higher capacity in parallel to the existing link between the nodes forming the two end points. Such an upgrade forms a multilink bundle, with an aggregate bandwidth that is essentially the sum of the bandwidths or throughput rates of the parallel links in the bundle.

The multilink bundle does offer increased capacity; however, its use presents certain problems. To utilize the links in the bundle effectively as an aggregate requires that the bundle effectively appear as a single interface to each end-point node. At one logical level, traffic intended for transport through this interface must appear as a single, unified data stream. However, within the bundle, it is necessary to segregate the traffic and distribute segments of traffic to the different links.

To maximize utilization of the parallel links within a multilink bundle, the packet communication load on the two or more parallel links are "balanced," that is to say the volume of packet data traffic through the bundle must be optimally distributed between the various parallel links. A number of known algorithms are used to select which link to use to transport the various packets between the end-points and thereby balance the load on the links.

One type of approach manages the packet routing over the links based on link utilization. For example, when traffic on a first link reaches a certain level, the sending node shifts further packet traffic over to the next parallel link. This approach tends to load one link first, then another, and so on. Another general class of load-balancing techniques evenly distributes packets across all the links regardless of the current level of utilization of any particular link. This later approach reduces packet latency. Within this class, there are a number of specific approaches to load balancing.

Many point-to-point links today use PPP, the Point-to-Point Protocol. RFC1717, "The Multilink Protocol (MP)," which is incorporated by reference herein in its entirety for all purposes, defines a standardized extension of the PPP, which enables combination of PPP links or channels into a "Multilink bundle" for higher rate point-to-point communications. The Multilink Protocol (MP) uses packet fragmentation and a round-robin link assignment technique to distribute portions of data traffic over the various links within a bundle.

A typical load-balancing situation using the Multilink Protocol involves a point-to-point bundle of links between two peers, for example, between two routers. A common implementation may use multiple ISDN links between the nodes, for example basic rate or primary rate (T1) ISDN connections. A router at one end of the bundle separates a long Internet Protocol (IP) packet into two or more fragments and adds an MP sequence header to each fragment. The load-balancing algorithm distributes the fragments taken from each packet over an appropriate number of the links, to allow parallel transmission through the bundle. In this manner, packets from a particular flow actually utilize any or all of the links in the bundle.

The communications over parallel links may encounter different delays in transmission. Fragments of one packet or succeeding packets may arrive at the receiver in a different order than when sent out over the multilink bundle. The PPP Multilink Protocol therefore uses packet sequencing to order fragments and packets. Specifically, a sequence number included in the header of each fragment of a packet allows the receiver to reorder the fragments and packets properly as they arrive over different links in the bundle. The use of the sequence numbers, the differences in transit time through the links and the subsequent reordering all add delay and processing time.

During fragment reassembly, it may be discovered that one of the fragments is missing. Accordingly, the packet cannot be fully reconstructed and all of the fragments of that packet should be dropped. Multilink PPP fragment reassembly algorithms depend on heuristic measures to aid in dropping fragments received on a link when others that are part of the whole packet do not arrive in time on one or more of the constituent links.

RFC 1990, "The PPP Multilink Protocol (MP)," which is incorporated herein by reference in its entirety for all purposes, suggests one heuristic to detect fragment loss on a Multilink PPP bundle. The heuristic detects fragment loss based on the assumption that either a fragment with (E)nd bit that is part of an incomplete packet is present or a fragment with (B)egin bit following an incomplete packet is present. If neither of these conditions matches for a sequence of one or more packets, such packet loss will not be detected. This heuristic measure, only helps in saving some processing cycles, but may not detect the fragment loss at an early time. This could mean that for the duration for which the fragments are outstanding, resources will be locked out. Lack of a good method to detect and stop resource usage on miscreant bundles, could lead to system-wide resource crunch that could affect the other benign bundles.

BRIEF SUMMARY OF THE INVENTION

In brief, embodiments of the present invention provide a way to measure resource utilization and to take corrective action when a single bundle uses a large portion of the resource. Every time a multilink fragment is received, its bundle is determined. On a per-bundle basis, the number of processing cycles spent on the fragment and the other resources it utilizes are accumulated and compared to a threshold value. If a threshold crossing is detected, one of several fairness actions are taken, which will ensure relinquishing or reduction in resource usage for miscreant bundles.

In a first embodiment, a method comprises monitoring utilization of a resource in a router associated with a multilink bundle; and taking a corrective action responsive to whether the monitored resource utilization for the multilink bundle exceeds a selected resource utilization threshold.

In a second embodiment, a router comprises a processor; a memory associated with the processor; a storage subsystem associated with the processor, configured to store a plurality of instructions that when executed by the processor cause the processor to take actions comprising: monitoring utilization of a resource associated with a multilink bundle; and taking a corrective action responsive to whether the monitored resource utilization for the multilink bundle exceeds a selected resource utilization threshold.

Other systems, methods, features, and advantages consistent with the present invention will become apparent to one with skill in the art upon examination of the following figures and detailed description. It is intended that such additional systems, methods, features, and advantages be included within this description and be within the scope of the invention.

BRIEF DESCRIPTION OF THE SEVERAL VIEWS OF THE DRAWINGS

The accompanying drawings, which are incorporated in and constitute a part of this specification, illustrate an implementation of methods and systems consistent with the present invention and, together with the description, serve to explain advantages and principles consistent with the invention. In the drawings.

DETAILED DESCRIPTION OF THE INVENTION

Figure 1:
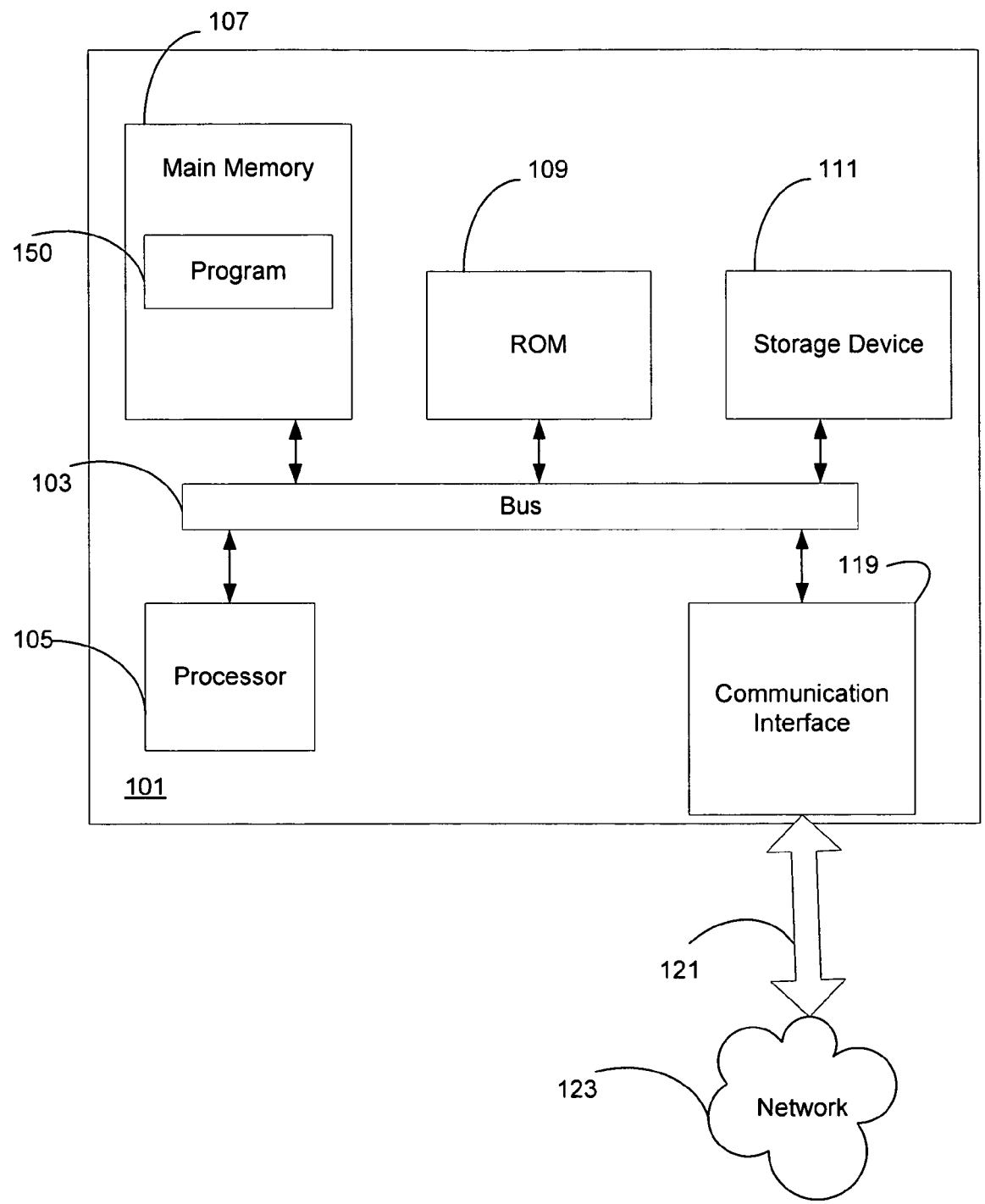
FIG. 1 illustrates an exemplary router according to one embodiment.

FIG. 1 illustrates an exemplary router 101 according to one embodiment. Router 101 includes a bus 103 or other communication mechanism for communicating information, and a processor 105 coupled with bus 103 for processing the information. In some embodiments, multiple processors 105 can be used. Router 101 also includes a main memory 107, such as a random access memory (RAM) or other dynamic storage device, coupled to bus 103 for storing information and instructions to be executed by processor 105. In addition, main memory 107 may be used for storing temporary variables or other intermediate information during execution of instructions to be executed by processor 105. Main memory 107 includes a program 150 for monitoring and correcting resource utilization by multilink bundles, as described below. Router 101 further includes a read only memory (ROM) 109 or other static storage device coupled to bus 103 for storing static information and instructions for processor 105. A storage device 111, such as a magnetic disk or optical disk, is provided and coupled to bus 103 for storing information and instructions.

According to one embodiment, processor 105 executes one or more sequences of one or more instructions contained in main memory 107. Such instructions may be read into main memory 107 from another computer-readable medium, such as storage device 111. Execution of the sequences of instructions in main memory 107 causes processor 105 to perform the process steps described herein. One or more processors in a multi-processing arrangement may also be employed to execute the sequences of instructions contained in main memory 107. In alternative embodiments, hard-wired circuitry may be used in place of or in combination with software instructions. Thus, embodiments are not limited to any specific combination of hardware circuitry and software.

Although described relative to main memory 107 and storage device 111, instructions and other aspects of other embodiments may reside on another computer-readable medium, such as a floppy disk, a flexible disk, hard disk, magnetic tape, a CD-ROM, magnetic, optical or physical medium, a RAM, a PROM, and EPROM, a FLASH-EPROM, any other memory chip or cartridge, or any other medium from which a computer can read, either now known or later discovered.

Router 101 also includes a communication interface 119 coupled to bus 103. Communication interface 119 provides a two-way data communication coupling to a network link 121, which may be a multilink bundle, that is connected to a local or wide-area network 123. Wireless links may also be implemented. In any such implementation, communication interface 119 sends and receives signals that carry digital data streams representing various types of information.

Figure 2:
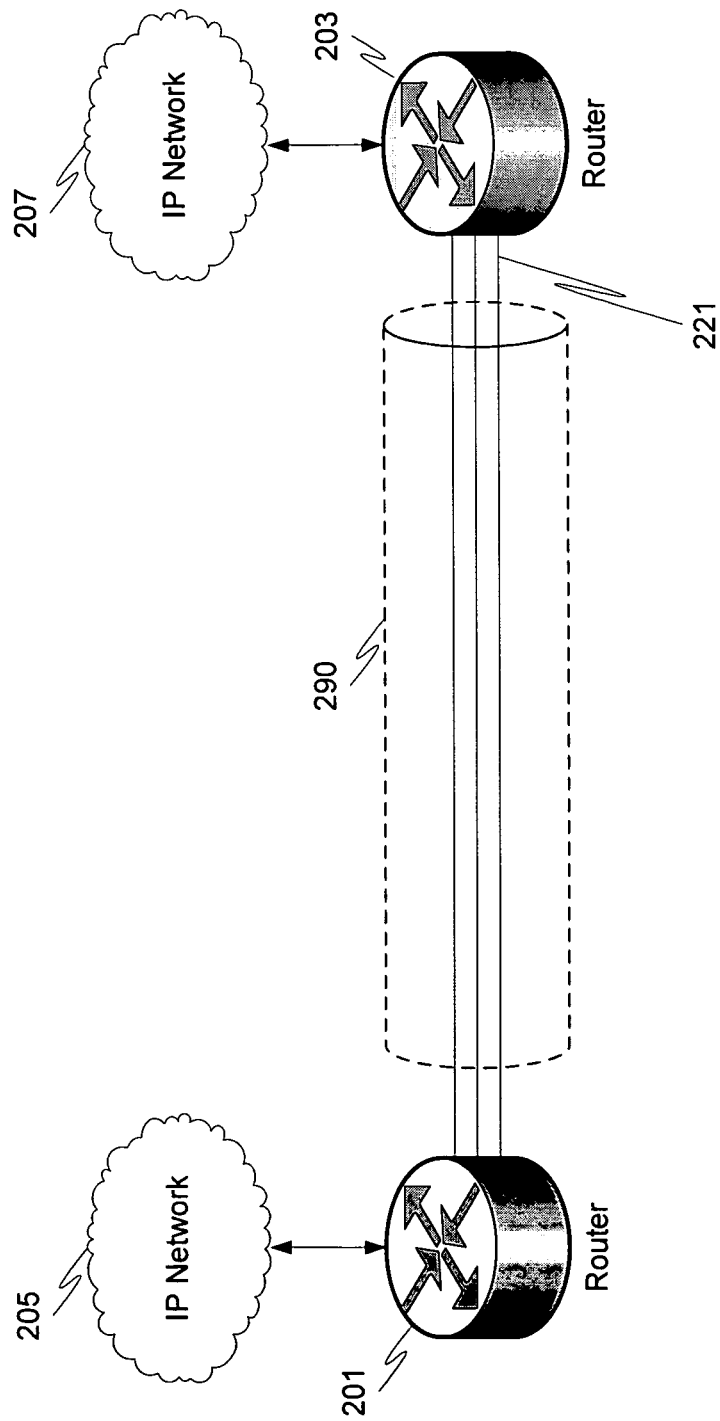
FIG. 2 illustrates a multilink PPP bundle.

Consider a typical implementation of a multilink bundle. As shown in the example of FIG. 2, a first router 201 conducts peer-to-peer communications with a second router 203. Each router 201 and 203 provides two-way IP packet communication services for one or more devices (not shown) that are coupled to the respective router through some form of IP network, shown generically as clouds 205 and 207. Although other protocols may be used, in one embodiment, the routers utilize MP to transport IP packets over a bundle 290 comprising two or more parallel links or channels 221. As shown in FIG. 2, three such parallel links 221 are included in the bundle 290. The number of links 221 shown in FIG. 2 is exemplary and illustrative only, and any plurality of links can be used.

The links 221 in the bundle 290 may be physical links of the same or different bandwidth extending in parallel between the two peers, in the example between the two routers 201 and 203. For example, a bundle of three links 221, such as shown in FIG. 2, may include three primary rate interface (PRI) ISDN links or three T1 lines. Alternatively, two or more of the links 221 may be logical channels carried over the same physical link, such as two B-channels of a basic rate interface (BRI) ISDN line.

The routers utilize MP to aggregate the bandwidth of the individual links 221 so that the bundle 290 appears as a unified logical interface for IP communications between the routers 201 and 203. The router processing for communication over this bundle 290 takes maximum advantage of the fragmentation and interleaving capabilities of MP. In MP, large packets are broken up into multiple segments or "fragments" sized appropriately for the multiple physical links.

Figure 3:
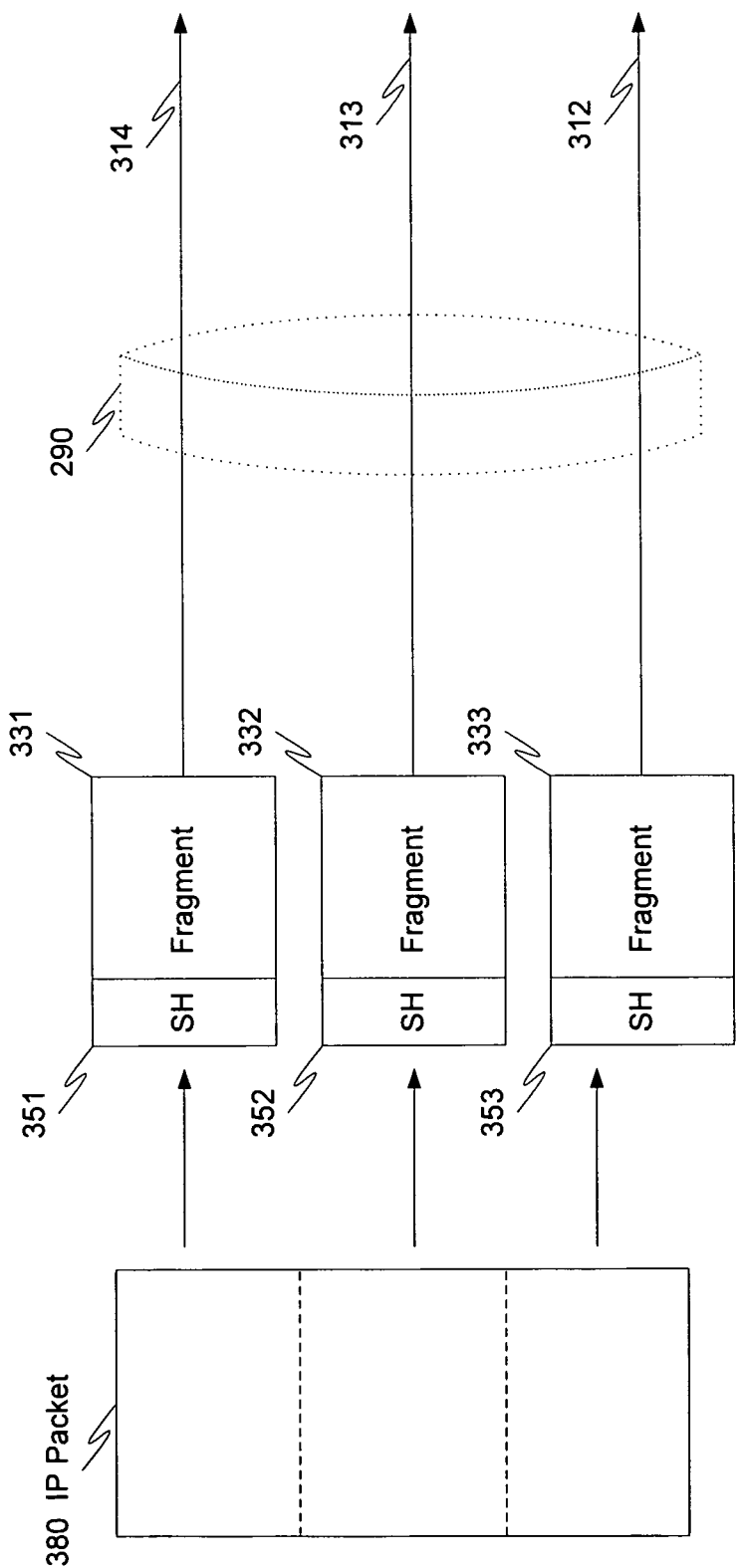
FIG. 3 illustrates packet fragmentation.

To illustrate this point, FIG. 3 shows a large IP packet 380. For purposes of this discussion, assume that the packet 380 relates to a communication from router 201 to router 203, for example for an FTP or HTTP transmission. The router 201 may receive the packet 380 from a device coupled to IP network 205. The packet includes a destination address associated with a device on IP network 207, and the router 201 must forward the packet over the bundle 290 to the router 203.

In this example, the router 201 breaks the large IP packet 380 into a series of fragments, shown for example as the three fragments 331, 332, and 333. The fragments may have the same size if the links have similar bandwidths or bit-rates; or the fragments may be sized to correspond to differences in the capacities of the links. An MP sequence header (SH) is inserted before each section. The first fragment of a multilink packet in PPP, for example, will have two headers, the SH for the fragment followed by the IP header for the packet itself. In the example, sequence header 351 is added to fragment 331, sequence header 352 is added to fragment 332, and sequence header 353 is added to fragment 333.

Each sequence header SH includes the MP Identifier. Typically, MP fragments are encapsulated using the protocol identifier 0x00–0x3d. Following the protocol identifier, the sequence header includes the actual Multilink header, which is a four-byte header containing a sequence number, and two one-bit fields indicating that the fragment begins a packet or terminates a packet. After negotiation of an additional PPP Link Control Protocol (LCP) option, a two-byte header with only a 12-bit sequence space may optionally replace the four-byte header. The format of this sequence header SH is defined in RFC 1717 and RFC 1990, previously incorporated by reference.

In the example shown in FIG. 3, the bundle 290 includes three links 221 identified separately as links 312, 313, and 314 for clarity of the discussion. The router 201 maintains a separate queue for each link 312, 313, and 314, and assigns each new fragment to one of the queues in such a manner as to distribute traffic over all of the links 312, 313, and 314 in a balanced manner, typically using a round-robin assignment algorithm. In the example shown in FIG. 3, fragment 331 and its header 351 can be queued-up for transmission over link 314, fragment 332 and its header 352 can be queued-up for transmission over link 313, and fragment 333 and its header 353 can be queued-up for transmission over link 312.

The fragmentation allows parallel transmission of the segments of the large packets over any two or more of the parallel links. As such, a best effort communication may use any or all of the bandwidth of any or all of links 312, 313, and 314 in the bundle 290. The traffic load generated by such packets is evenly distributed over the links. If differential delays on the links cause fragments to arrive out of order, the receiver (in router 203 in the example of FIG. 2) can utilize the sequence numbers to reorder the fragments as needed to reconstruct the original IP packet 380 before further transmission thereof over the IP network 207.

Figure 4:
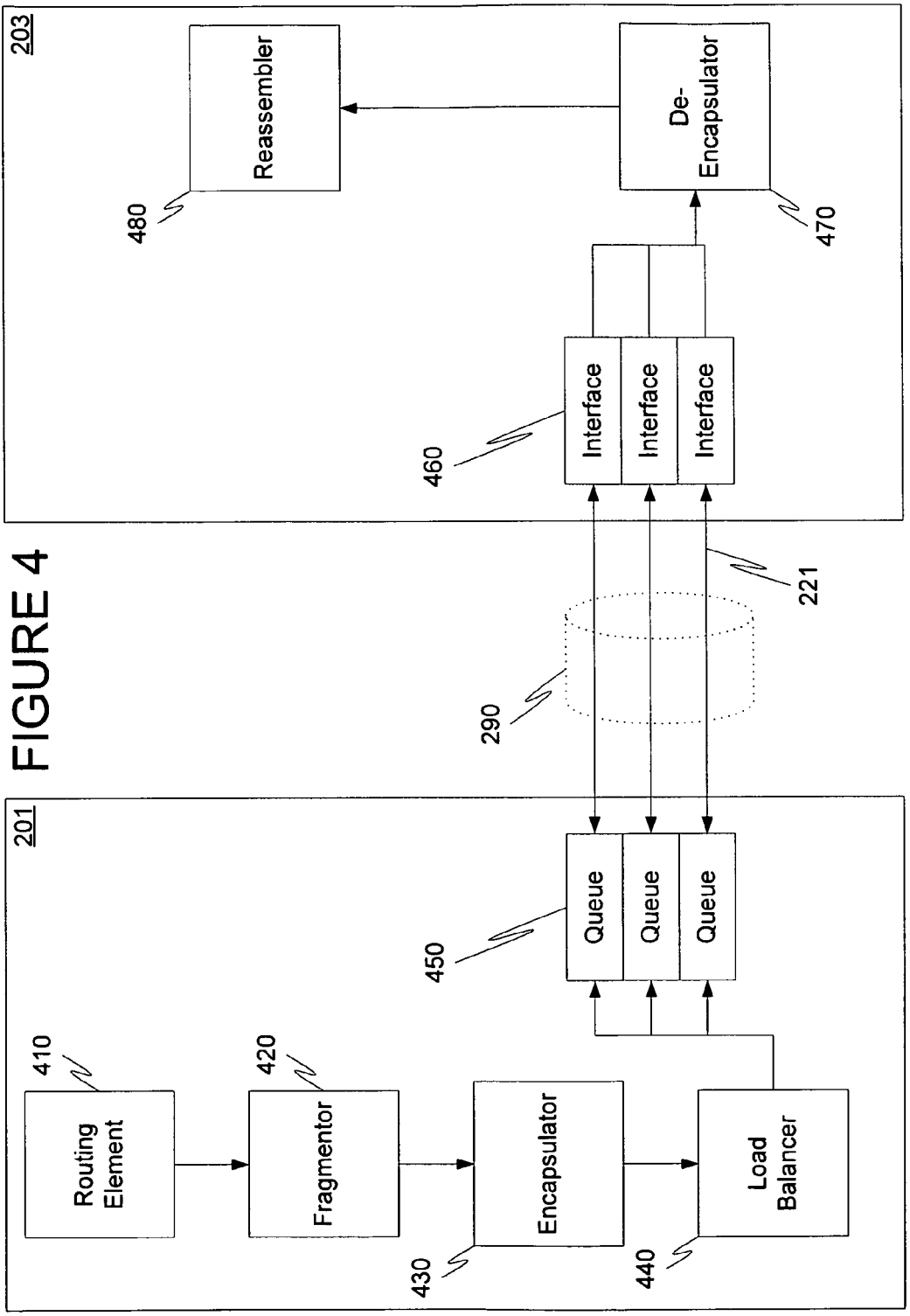
FIG. 4 illustrates a system for transmitting packets over a multilink PPP bundle according to one embodiment.

FIG. 4 is a block diagram of the logical processing elements within the routers 201 and 203, as they send and receive packets over the links of the bundle 290. The blocks illustrated in the drawing may be implemented with any appropriate combination of hardware and software. The sending router (as illustrated in FIG. 4, router 201) includes one or more routing elements 410 for receiving IP packets from other network links and performing a routing function. When the IP packet processing indicates a need to transmit a packet via the bundle 290, the routing element 410 supplies the packet to a fragmentor 420 for packet fragmentation. The fragmentor 420 fragments packets larger than a predetermined size into smaller portions or fragments. The maximum fragment size typically corresponds to the smallest bandwidth of any of the links in the bundle times the maximum delay for communication of a fragment over a link in the bundle. The fragmentor 420 supplies the fragments of each packet to encapsulator 430, which performs the function of MP encapsulation. As part of this encapsulation, this encapsulator 430 assigns a sequence number to each fragment and adds the sequence number header to each fragment, as outlined above relative to FIG. 3.

The encapsulated fragments are then processed through a load-balancing algorithm by load balancer 440. The load-balancing algorithm used by load balancer 440 distributes the fragments to queues 450 to await transmission through bundle 290.

The receiving router (as shown in FIG. 4, router 203) includes multiple interfaces 460, to the various links 221 of the bundle 290. Each interface 460 receives a series of packets and fragments from the transmitter interface in the router or other node associated with the opposite end of the multilink bundle 290. The interfaces 460 supply the packets and fragments to a packet de-encapsulator 470, which de-encapsulates the packet fragments consistent with MP. The de-encapsulator 470 supplies the packet fragments to a reassembler 480 for a reassembly operation to reconstruct the original IP packets from the fragments. During reassembly, reassembler 480 determines whether any fragments of a packet were lost, and if so, drops the fragments associated with that packet.

Figure 5:
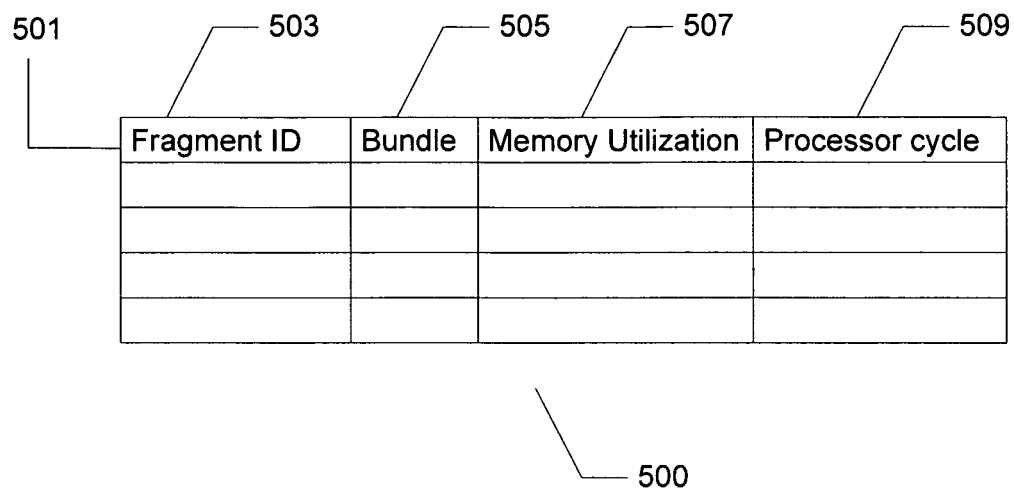
FIG. 5 illustrates an exemplary data structure used in one embodiment for monitoring resource utilization by a multilink bundle.

In one embodiment, for each fragment received at the interfaces 460, a fragment resource utilization record is recorded in a bundle resource utilization table 500, which may be any data structure capable of associating entries to fields corresponding to those entries. An exemplary bundle resource utilization table 500 is depicted in FIG. 5. By way of example, in the bundle resource utilization table 500, each fragment received has a corresponding fragment utilization record 501 including a fragment identifier field 503, a bundle identifier field 505, a memory utilization field 507, and a processor cycle field 509. The fragment identifier field 503 identifies the fragment received, and the bundle identifier field 505 identifies the MP bundle over which the fragment was received. The memory utilization field 507 indicates how much memory the fragment and processing thereof is using, typically in megabytes. The processor utilization field 509 indicates the processor resources spent processing the fragment, in some embodiments expressed as a processor cycle count or some other convenient value. The fields of table 500 and the arrangement thereof are exemplary and illustrative only and other fields and arrangements thereof can be used. The data structure 500 can be maintained in the memory 107 of a router 100 or stored in any storage device 111 as desired.

In one embodiment, parameters are defined or controlling the fairness of the processor usage by multilink bundles. These parameters can include a parameter for a threshold processor usage, and an action parameter that determines what action should be taken if the processor usage for a bundle exceeds the threshold value and can be considered overloaded. Exemplary actions can include ignoring the threshold crossing, dropping all packets for the corresponding bundle 290, and dropping all fragments for the bundle 290. Other actions can be defined as desired. These parameters can be maintained in memory 107 or stored in any storage device 111 of the router 101 as desired; default values can also be stored in ROM 109 if default values are defined. In some embodiments, a default threshold, such as 85% of the processor, is used if no value is set for the processor threshold parameter.

In some embodiments, these and other parameters may be set globally for all bundles. In other embodiments, these and other parameters may also be set separately for individual bundles, allowing different values to be set for each bundle, if desired.

In other embodiments, additional parameters can be defined for controlling the fairness of the memory usage by bundles. These parameters can include a parameter for a threshold memory usage, typically in megabytes, and an action parameter that determines what action should be taken if the memory usage for a bundle exceeds the threshold value. Similar actions can be defined as with the action parameter for the processor usage.

A user interface can be created to allow administrators of the router 101 to set and change parameters related to the fairness control, using any desired interface, including a Command Line Interface (CLI). Furthermore, in some embodiments, a user interface such as CLI can provide a way to view one or more of the records 501, any of the fields 503, 505, 507, or 509 contained in record 501, or any other relevant data.

In some embodiments, messages or other output data may be generated and written, viewed or displayed on an operator console of the router 101 or remotely through any desired display technique at a convenient remote location. For example, messages can be generated to display per-bundle processor usage, memory usage, or other similar information for debugging or operational purposes. In another example, aggregate information can be generated from the per-bundle information and output as messages or other displays.

In some embodiments, a flag can be set to indicate that the multilink bundle has crossed the threshold parameter for processor usage. Then in every control path, the processor can determine the bundle currently being processed and the processor cycles used for that bundle, updating the flag value if the threshold value has been crossed in either direction, allowing the control paths to check the flag and to take the desired action as set by the action parameter.

Figure 6A:
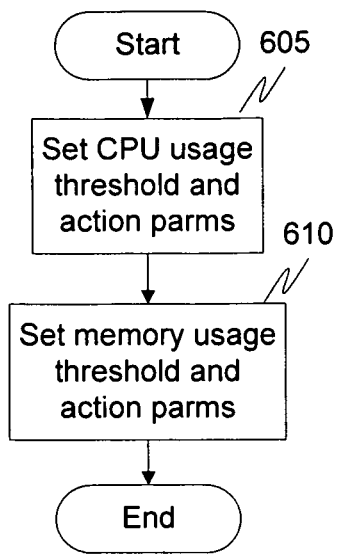
FIGS. 6A, 6B, and 6C are flowcharts illustrating one embodiment of a technique for monitoring bundle resource utilization and taking corrective action.
Figure 6C:
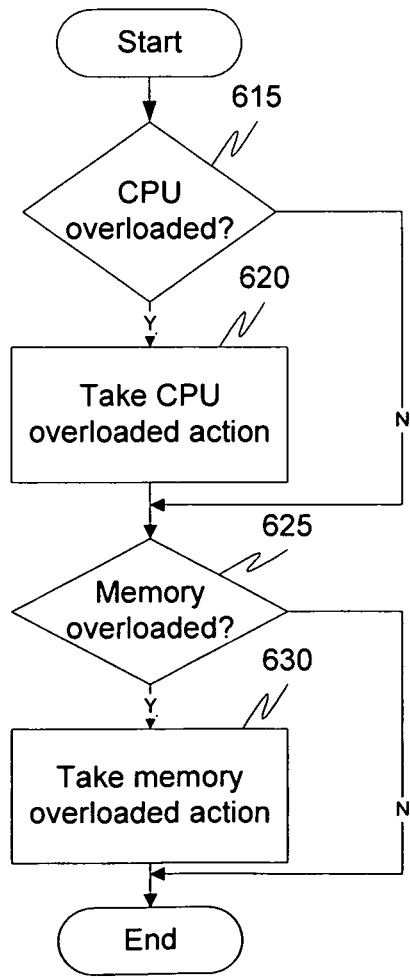
Figure 6B:
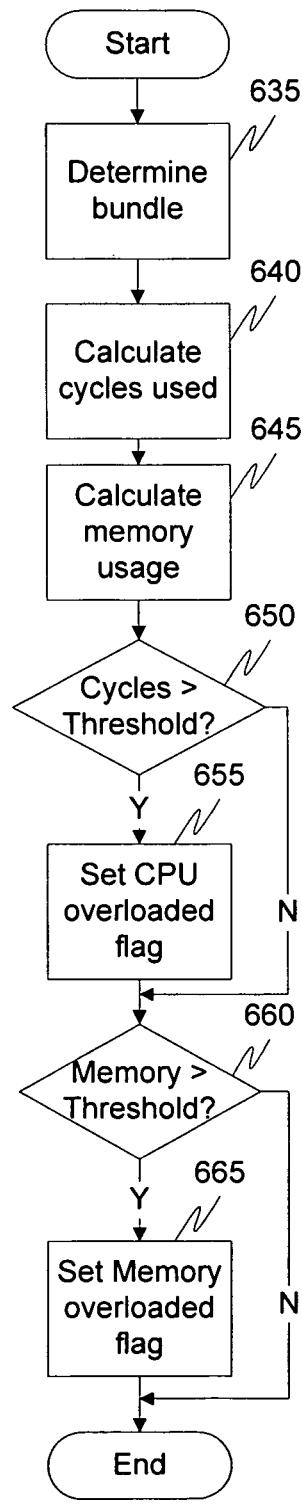

One embodiment of an algorithm for monitoring resource usage is illustrated in FIGS. 6A, 6B, and 6C. The flow charts of FIGS. 6A, 6B, and 6C are exemplary and illustrative only and other steps and ordering of steps can be used. In particular, some embodiments may provide one or more debugging instrumentation points to allow debugging a router 101.

FIG. 6A illustrates a technique for setting parameters related to fairness control of resource utilization. In block 605, any convenient user interface, such as a CLI, can be used to set a processor usage threshold value, typically expressed as a percentage of the processor, and the action to be taken when that threshold is exceeded. In block 610, that same interface can be used to set a threshold and action based on memory usage, typically expressing the threshold in megabytes. As will be understood by one skilled in the art, other parameters can be defined and set by the user interface. In some embodiments, blocks 605 and 610 can be performed at any time, allowing dynamic modification of the parameters.

FIG. 6B illustrates a technique for monitoring the resource utilization by a multilink bundle. In every control path that operates on multilink bundles, determine the bundle being processed in block 635. In block 640, the processor usage for that bundle is calculated and stored in the records 501 for the bundle in field 509 or in any other convenient data structure. Similarly in block 645, the memory usage for that bundle is calculated and stored in field 507. There are numerous techniques for calculating processor usage known to the art, and any desired or convenient technique can be used. In one embodiment, a processor monitor can be created to monitor processor usage that can be queried for this value. In other embodiments, hardware counters or other similar hardware or software functionality can be used for this purpose. Similar techniques can be used for determining the memory usage. Some embodiments may only track or monitor processor usage. Other embodiments may only monitor memory usage.

Then in block 650, each control path checks if the processor usage or cycle count exceeds the threshold parameter. If so, then in block 655, a flag can be set to indicate whether the bundle has exceeded the processor usage threshold. Similarly, in block 660 and 665, memory usage can be compared to the threshold parameter and a flag set to indicate whether the memory usage has exceeded the threshold parameter. If the processor or memory usage flag was previously set when usage exceeded the threshold value, but usage has declined below the relevant threshold, the flag can be reset to indicate the bundle's resource utilization is below the threshold.

The flag or flags described above can be implemented in any convenient or desired manner known to those in the art. In some embodiments, a bit in a convenient register can be used for the flags. In other embodiments, the flags can be implemented as a memory location of any convenient size.

FIG. 6C then illustrates the use of the flag or flags described above. In every control path involved in processing the bundle, the steps of FIG. 6C can be used to take the action defined by the process or memory overload actions. In block 615, the processor threshold exceeded flag is checked and if set, then in block 620 the selected overload action is performed, such as dropping packets or fragments associated with the multilink bundle using excessive resources. Similarly, in block 625, the memory usage flag is checked and if set, in block 630 the selected overload actions are performed. As explained above, some embodiments may only be concerned with processor usage or memory usage, in which case the blocks associated with the other resource can be omitted. By taking this corrective action, fairness control of the multilink bundle can be achieved, keeping a miscreant multilink bundle from overwhelming the router while starving benign multilink bundles.

In some embodiments, the router 101 may have multiple processors, some of which are used for fragmentation or defragmentation, and others used for other purposes such as quality of service (QoS) or sequencing of packets or fragments. In such embodiments, the resource utilization measurement and fairness control techniques can be limited to the fragmentation processor.

In some embodiments, a timer can be used to periodically trigger execution of the steps shown in FIGS. 6B and 6C. On a predetermined interval, a timer thread is run, which can sweep through all of the bundles being processed, determining if one or more of those bundles has exceeded the predetermined threshold values for resource utilization using the steps shown in FIGS. 6B and 6C.

While there has been illustrated and described embodiments consistent with the present invention, it will be understood by those skilled in the art that various changes and modifications may be made and equivalents may be substituted for elements thereof without departing from the true scope of the invention. Therefore, it is intended that this invention not be limited to any particular embodiment disclosed, but that the invention will include all embodiments falling within the scope of the appended claims.

I claim:

1. A method, comprising:
   setting, by a router, a processor usage threshold value for a multilink bundle having a plurality of network links, a memory usage threshold value for the multilink bundle, and a corrective action to be taken when the processor usage threshold value or memory usage threshold value is exceeded for the multilink bundle, wherein the memory usage threshold value and processor usage threshold value provide fairness control of resource utilization for the multilink bundle;

receiving, by the router for processing, data fragments through the plurality links of the multilink bundle;

determining, by the router, an identifier of the multilink bundle, processor usage for the multilink bundle, and memory usage for the multilink bundle;

determining based on the identifier of the multilink bundle, by the router, whether the processor usage exceeds the processor usage threshold value or the memory usage exceeds the memory usage threshold value set for the multilink bundle; and taking, by the router, the corrective action when the processor usage threshold value or memory usage threshold value for the bundle has been exceeded.

2. The method of claim 1, wherein the memory is allocated to processing the multilink bundle.

3. The method of claim 1, wherein the memory is allocated to processing packet fragmentation associated with the multilink bundle.

4. The method of claim 1, wherein the corrective action comprises dropping all packets associated with the multilink bundle.

5. The method of claim 1, wherein the corrective action comprises dropping fragments of packets associated with the multilink bundle.

6. The method of claim 1, further comprising:
measuring, by the router, the resource utilization associated with the multilink bundle;
modifying, by the router, an indicator if the measured resource utilization exceeds the processor usage threshold value or the memory usage threshold value; and
checking the indicator.

7. The method of claim 1, wherein taking the corrective action comprises:
checking, by the router, an indicator associated with the multilink bundle, the indicator indicating whether the processor usage threshold value or the memory usage threshold value for the multilink bundle has been exceeded; and
dropping, by the router, network fragments received by the router over the multilink bundle if the indicator indicates the threshold has been exceeded.

8. The method of claim 7, wherein dropping input received by the router further comprises:
dropping packets received by the router.

9. The method of claim 7, wherein dropping input received by the router further comprises:
dropping packets and packet fragments received by the router.

10. The method of claim 1, wherein taking the corrective action further comprises:
taking no action.

11. The method of claim 1, wherein taking the corrective action further comprises:
periodically checking, by the router, a status indicator; and
dropping, by the router, network fragments received by the router over the multilink bundle if the status indicator indicates that the processor usage threshold value or the memory usage threshold value has been exceeded.

12. The method of claim 1, further comprising:
storing in a bundle resource utilization table, by the router, the identifier of the multilink bundle, the processor usage of the multilink bundle, and the memory usage of the multilink bundle; and monitoring, by the router, the bundle resource utilization table to determine whether the processor usage exceeds the processor usage threshold value or the memory usage exceeds the memory usage threshold value set for the multilink bundle.

13. The method of claim 1, further comprising:
when the processor usage threshold value or memory usage threshold value has been exceeded, setting, by the router, a flag to indicate that the multilink bundle has exceeded the processor use threshold value or memory usage threshold value; and
upon determining the flag has been set, taking, by the router the corrective action.

14. A router, comprising:
a processor,
a memory associated with the processor;
a storage subsystem associated with the processor, configured to store a plurality of instructions that when executed by the processor cause the processor to:
set a processor usage threshold value for a multilink bundle having a plurality of network links, a memory usage threshold value for the multilink bundle, and a corrective action to be taken when the processor usage threshold value or memory usage threshold value is exceeded for the multilink bundle, wherein the memory usage threshold value and processor usage threshold value provide fairness control of resource utilization for the multilink bundle;
receive for processing, data fragments through the plurality of links of the multilink bundle;
determine an identifier of the multilink bundle, processor usage for the multilink bundle, and memory usage for the multilink bundle;
determine based on the identifier of the multilink bundle, whether the processor usage exceeds the processor usage threshold value or the memory usage exceeds the memory usage threshold value set for the multilink bundle; and
take the corrective action when the processor usage threshold value or memory usage threshold value for the bundle has been exceeded.

15. The router of claim 14, wherein the memory is allocated to the multilink bundle.

16. The router of claim 14, further comprising:
a timer, wherein taking the corrective action is performed periodically, responsive to the timer.

17. The router of claim 14, further comprising:
a data structure, configured to store:
the identifier of the multilink bundle;
a resource utilization value associated with the multilink bundle;
an indicator;
wherein the storage subsystem associated with the processor is further configured to store a plurality of instructions that when executed by the processor cause the processor to take actions comprising:
measuring the resource utilization associated with the multilink bundle;
storing the measured resource utilization in the data structure;
setting the indicator to a first value if the resource utilization value exceeds a selected threshold value; and
setting the indicator to a second value if the resource utilization value does not exceed the selected threshold value.

18. The router of claim 17, wherein the storage subsystem associated with the processor is further configured to store a plurality of instructions that when executed by the processor cause the processor to:

take the corrective action if the indicator has the first value.

19. The router of claim 14, wherein the storage subsystem associated with the processor is further configured to store a plurality of instructions that when executed by the processor cause the processor to:

drop all packets associated with the multilink bundle.

20. The router of claim 14, wherein the storage subsystem associated with the processor is further configured to store a plurality of instructions that when executed by the processor cause the processor to:

drop all packet fragments associated with the multilink bundle.

21. The router of claim 14, wherein the storage subsystem associated with the processor is further configured to store a plurality of instructions that when executed by the processor cause the processor to:

take the corrective action repeatedly until the monitored resource utilization for the multilink bundle does not exceed the selected resource utilization threshold.

22. The router of claim 14, wherein the storage subsystem associated with the processor is further configured to store a plurality of instructions that when executed by the processor cause the processor to:

store the selected resource threshold.

23. The router of claim 14, wherein the storage subsystem associated with the processor is further configured to store a plurality of instructions that when executed by the processor cause the processor to:

store a selected corrective action; and if the processor usage threshold value or the memory usage threshold value for the multilink bundle has been exceeded, take the stored selected corrective action.

24. The router of claim 14, wherein the storage subsystem associated with the processor is further configured to store a plurality of instructions that when executed by the processor cause the processor to:

display the monitored resource utilization associated with the multilink bundle.

25. The router of claim 14, further comprising:

a timer, wherein monitoring utilization of the processor usage and the memory usage is performed periodically responsive to the timer.

26. The router of claim 14, wherein the storage subsystem associated with the processor, is further configured to store a plurality of instructions that when executed by the processor cause the processor to:

store in a bundle resource utilization table the identifier of the multilink bundle, the processor usage of the multilink bundle, and the memory usage of the multilink bundle; and monitor, by the router, the bundle resource utilization table to determine whether the processor usage exceeds the processor usage threshold value or the memory usage exceeds the memory usage threshold value set for the multilink bundle.

27. The router of claim 14, wherein the storage subsystem associated with the processor, is further configured to store a plurality of instructions that when executed by the processor cause the processor to:

when the processor usage threshold value or memory usage threshold value has been exceeded, set a flag to indicate that the multilink bundle has exceeded the processor use threshold value or memory usage threshold value; and upon determining the flag has been set, take the corrective action.

* * * * *